Nov. 17, 1925.                      1,561,807
C. THUNEMANN
HAY CONVEYER
Filed March 20, 1924     2 Sheets-Sheet 1
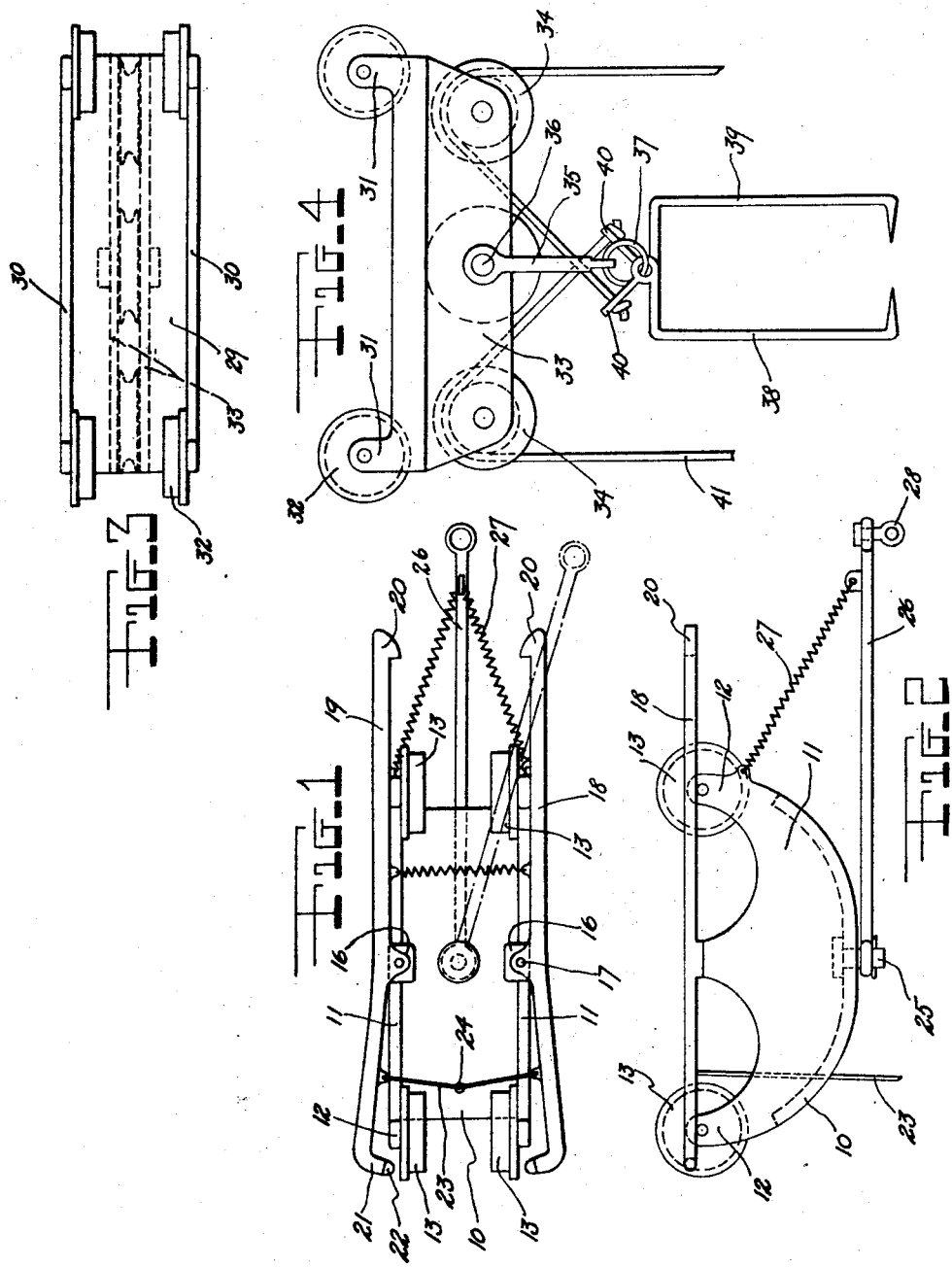
INVENTOR
C. Thunemann
BY
ATTORNEY

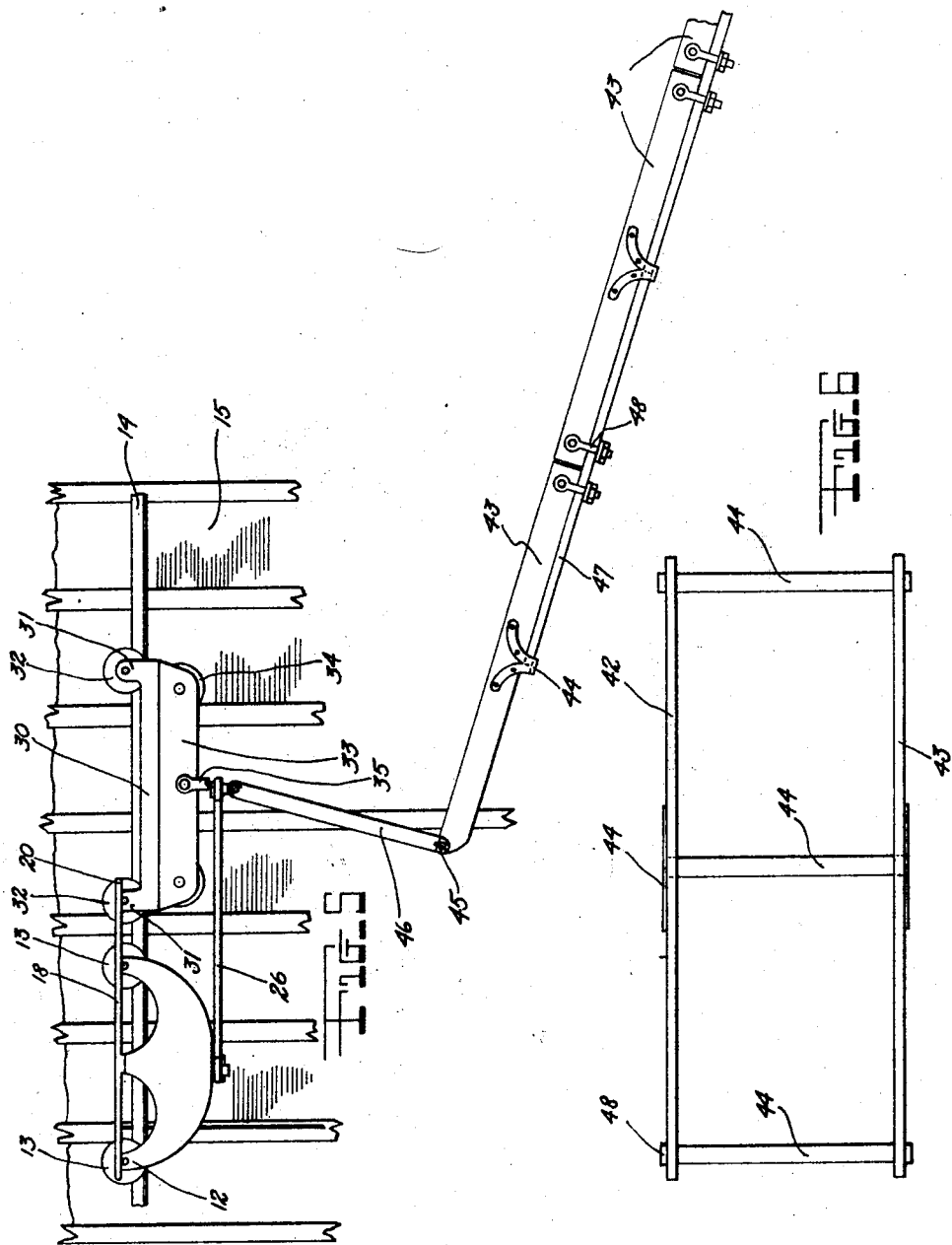

Patented Nov. 17, 1925.

1,561,807

UNITED STATES PATENT OFFICE.

CARL THUNEMANN, OF MUNNSVILLE, NEW YORK.

HAY CONVEYER.

Application filed March 20, 1924. Serial No. 700,499.

*To all whom it may concern:*

Be it known that I, CARL THUNEMANN, a citizen of Germany, residing at Munnsville, in the county of Madison and State of New York, have invented certain new and useful Improvements in Hay Conveyers, of which the following is a specification.

The main object of this invention is to provide a device constructed to be used within a barn, its purpose being to transport the hay from the hay fork to a position on the hay mow.

Another object is to provide a hay carriage from which forks are suspended and an additional carriage, both carriages riding upon the same track, the last-named carriage being provided with means whereby both carriages are coupled together, said last-named carriage having a slide guide attached thereto in such manner that the guide is suspended beneath the hay forks, the latter when being released, depositing the hay upon the guide to be transported to the position desired.

These and other objects will become apparent in the description below, in which like characters of reference refer to like-named parts in the drawing.

Referring briefly to the drawing, Figure 1 is a top plan view of the hay guide supporting carriage showing the coupling levers in their respective position.

Figure 2 is a side elevational view of Figure 1.

Figure 3 is a top plan view of the hay transporting carriage.

Figure 4 is a side elevational view of Figure 3.

Figure 5 is a side elevational view of a barn wall, showing the carriages of the device riding upon a rail, the hay guide being shown in position for receiving a fork of hay.

Figure 6 is a top plan view of a section of the hay guide.

Referring in detail to the drawing, the numeral 10 represents the body of the hay guide supporting carriage. Said carriage is provided with side walls 11 which are formed to present opposing ears 12 on opposite ends of the carriage. These ears have flanged pulleys 13 rotatably mounted on adjacent faces, the pulleys being adapted to ride on a rail 14 mounted adjacent a barn wall 15. Intermediate the length of the side walls 11 of the carriage, horizontal ears 16 are provided, these ears having pivoted pins 17 projecting upwardly which engage lugs formed intermediate the length of a pair of coupling levers 18 and 19, said levers being formed into hooks 20 at their forward ends. The rear ends of these levers have angularly inturned arms 21 whose ends are provided with rubber tips 22, said rubber tips being engageable on the flanged faces of members 13. Each of the levers have a manipulator cable 23 securely fixed to a lug on said levers. These cables pass thru an opening 24 in the floor of the carriage 10 and are adapted to be pulled when necessary. A stud 25 is pivotally mounted in the floor of the carriage 10 and rotatably supports a brace bar 26, this brace bar being supported at the forward end by springs 27, said springs being attached to the ears 12 of the carriage 10. An eye bolt 28 is pivotally mounted on the free end of the brace bar 26. Its purpose will be more fully hereinafter described. A hay transporting carriage is cooperative with the hay slide supporting carriage, and is shown in detail in Figures 3 and 4 of the drawing. This hay transport carriage comprises a body 29 having side walls 30 at the ends of which upwardly projecting ears 31 are formed, said ears having pins therein which support pulleys 32. The ears of the carriage are positioned in such manner that the hooks 20 of the levers 18 and 19 are engageable therewith. Beneath the hay transport carriage, spaced apart webs 33 are provided. These webs receive the grooved pulleys 34. At the ends and between these pulleys, a yoke 35 is pivoted on the short length of the shaft 36, the lower end of said yoke having a ring 37 mounted thereon. The latter supports a pair of grappling hooks 38 and 39 which are suspended from the ring and have arms 40 to whose ends are attached releasing cables 41. The hay slide illustrated in Figures 5 and 6 is comprised of sections of identical structure. These sections are constructed by providing two parallel side boards 42 and 43, the side boards being retained in spaced apart relation by the braces 44. The end hay slide, which is attached to the brace bar 26, has one of the end brace bars 44 omitted, and instead has pins 45 extending outwardly from the sides of the boards 42 and 43. Strips 46, suspended from member 28 on the brace bar 26, are pivotally attached to these pins and are retained in place by cotter pins so as to be readily disengaged. The hay slide sections are arranged end to end and are connected by sliding connecting strips 47 between the central brace bar 44 of adjacent sections, as illustrated in Figure 5. The ends of the boards 42 and 43 have pivoted bolts mounted thereon which extend below the bottom edge of said boards and adjustably support the end brace bars 44. When the strips have been slipped into place, the ends on the pivoted bolts 48 are tightened in order to jam the brace bars down upon the strips 47 and bring the adjacent sections together.

The track 14 usually extends the length of a barn, its one end passing directly in front of the door of the barn, the door end of the track being on the right hand side of the drawing in Figure 5. In transporting hay from a wagon in front of the door of the barn to the confines of the barn, the transport carriage 29 is moved to the end of the track and the grappling hooks 38 and 39 are opened. When said hooks pinch a fork full of hay, the cables 41 are pulled. The grappling hooks will be rotated by the ring mutually toward each other and the hay will be suspended from said hooks. The carriage 29 is then shifted to the position where the hay guide supporting carriage is positioned. As the transport carriage 29 arrives adjacent the hay slide supporting carriage, the curved surfaces of the hooks 20 will ride upon the ears 31 of the carriage 29 and will rotate the levers 18 and 19 outwardly at their forward ends. As travel of the carriage 29 continues, the hooks 20 will engage the ears 39 and lock the carriages 10 and 29 together. When in this position, the brace bar 26 may be rotated about the stud 25 to a position below the grappling hooks 38 and 39. These hooks may then be opened and the hay allowed to drop upon the hay slide sections which in turn transport the hay from the grappling hooks to the mow. In order to release the carriages from engagement, the cables 23 are pulled. This action moves the rear end of the levers toward each other and upon the front ends so that the hooks 20 are spread to permit the ears 31 of the carriage 29 to pass them.

I claim:—

1. A device of the class described comprising a wheeled carriage, a brace bar pivotally supported on said carriage, coupling levers pivoted on said carriage, the forward ends of said levers having hook projections, a spring connecting said levers forwardly of the point of rotation, cables connected to said levers and adapted to open the hook ends of the same when pulling on said cables, a hay transport carriage having ears thereon, the ears supporting wheels, said ears being engageable with the hook end of said levers to interlock both carriages, and means for stopping the travel of the first-named carriage when said coupling levers are spread apart.

2. A device of the class described comprising a wheel carriage, a brace bar pivotally supported on said carriage, horizontal ears extending toward each other on the carriage intermediate its length, coupling levers pivoted on said ears, the levers extending longitudinally on the carriage, the forward ends of said levers projecting beyond the forward ends of said carriage, and means at the rear ends of said levers for braking the rear wheels of the carriage.

3. A device of the class described comprising a wheeled carriage, a brace bar pivotally supported on said carriage, horizontal ears extending toward each other on the carriage intermediate its length, coupling levers pivoted on said ears, the levers extending longitudinally on the carriage, the forward ends of said levers projecting beyond the forward ends of said carriage, springs connecting the same, the rear ends of said levers extending angularly outward from the sides of said carriage, said rear portions of said levers having inturned ends, rubber tips on the inturned ends of said levers adapted to contact with the surface of the rear wheels to cause braking of the same, and cables connected to the rear ends of said levers and adapted to move the rear ends of said levers mutually toward each other and spread the forward ends.

In testimony whereof I affix my signature.

CARL THUNEMANN.